H. E. A. RAABE.
ENGINE VALVE GEAR.
APPLICATION FILED MAY 29, 1914.

1,264,437.

Patented Apr. 30, 1918.
4 SHEETS—SHEET 1.

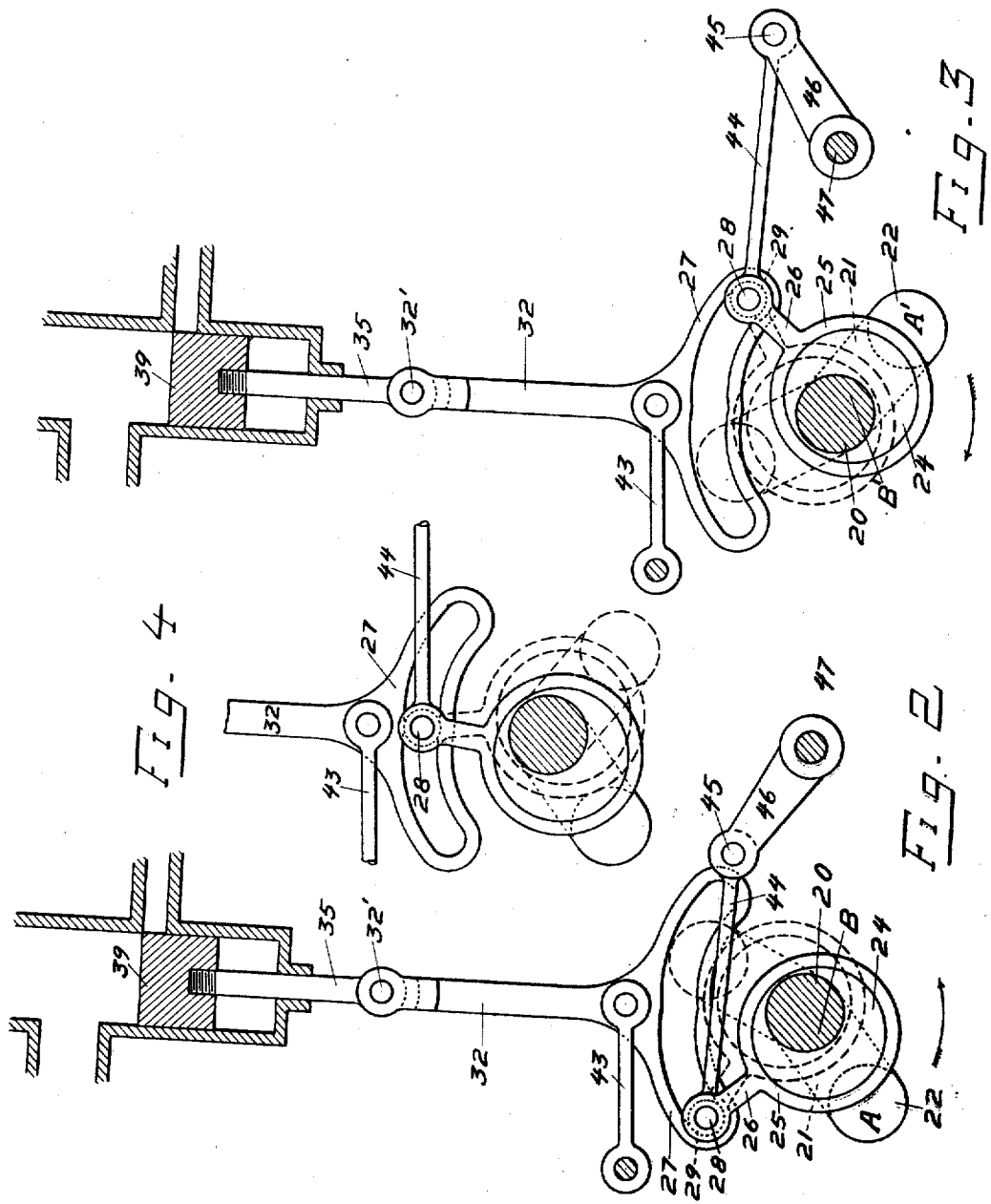

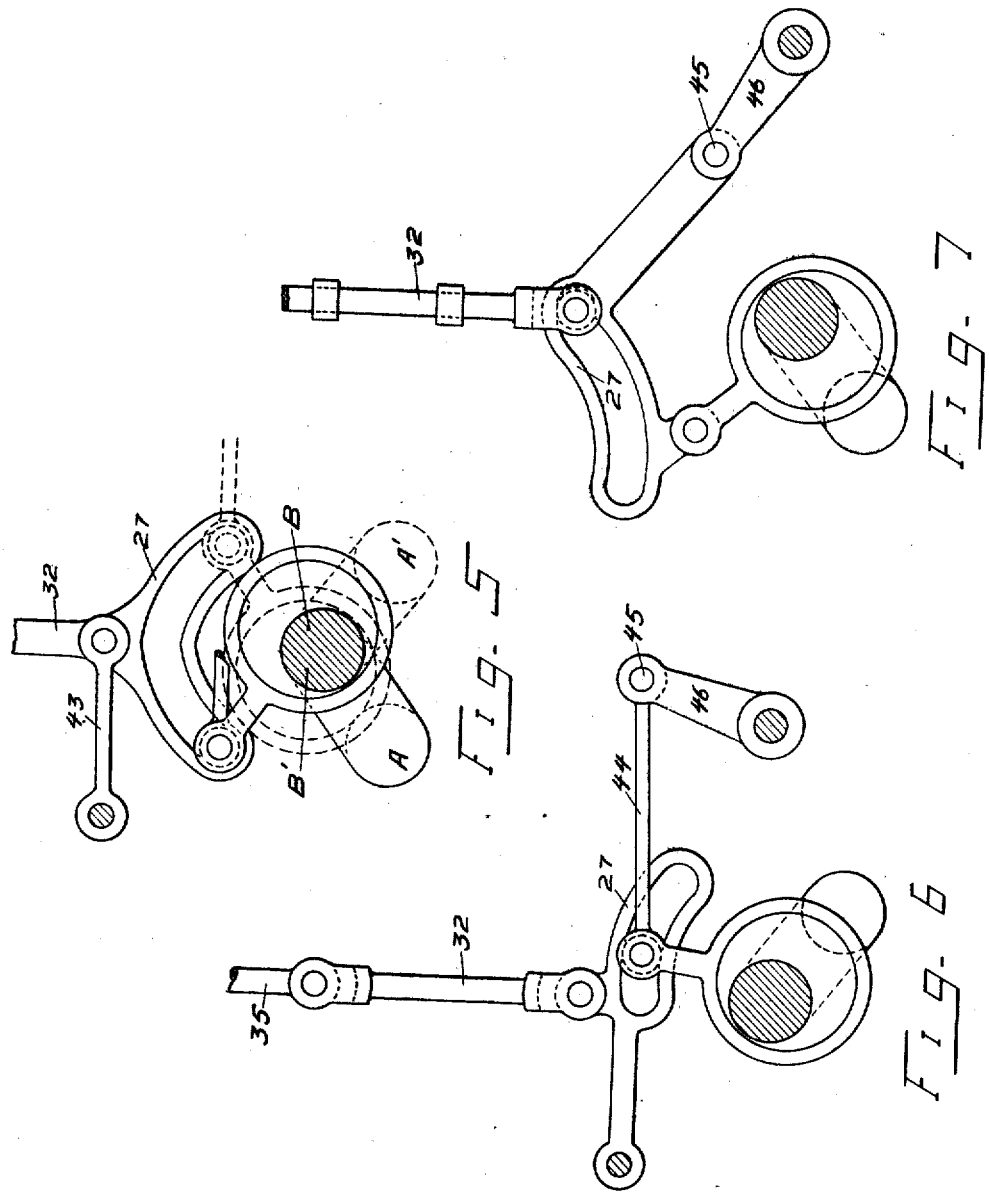

H. E. A. RAABE.
ENGINE VALVE GEAR.
APPLICATION FILED MAY 29, 1914.

1,264,437.

Patented Apr. 30, 1918.
4 SHEETS—SHEET 4.

WITNESSES:
Benj. A Dare
Andw. Lindsay Crawford

INVENTOR
Henry E. A. Raabe

UNITED STATES PATENT OFFICE.

HENRY E. A. RAABE, OF JERSEY CITY, NEW JERSEY.

ENGINE VALVE-GEAR.

1,264,437.   Specification of Letters Patent.   Patented Apr. 30, 1918.

Application filed May 29, 1914. Serial No. 841,802.

*To all whom it may concern:*

Be it known that I, HENRY E. A. RAABE, a citizen of the United States, residing at Jersey City, in the county of Hudson and State of New Jersey, have invented a certain new and useful Engine Valve-Gear, of which the following is a specification.

My invention is to be applied chiefly to such engines as described in my applications for Letters Patent Serial Number 214,503 filed June 28th, 1901, and Serial Number 557,649 filed April 26th, 1910, and is to be regarded as a continuation of these applications.

One object of my invention is to provide means for operating an exhaust valve so as to regulate the speed or power of the engine by variable compression governed by advancing or retarding the opening and closing of the valve relatively to the stroke of the piston, and also to effect the opening and closing of the atomizing and starting valve, described in my application for Letters Patent Serial Number 835,638 filed May 1st, 1914, as well as the operation and timing of the oil pump and igniting device.

Another object of my invention is to provide a valve gear which will enable the operator to start the engine positively in either direction without special starting appliances.

The invention will be fully described hereinafter, and the features of novelty pointed out in the claims.

Reference is to be had to the accompanying drawings, forming part of this specification, in which similar characters of reference indicate corresponding parts in the figures, in which Figure 1 is a partial sectional elevation of an engine provided with this valve gear showing the exhaust valve at the point of opening, and the valve gear as it is constructed on an engine in actual operation.

Fig. 2 is an elevation of the valve gear in a more elementary form, fully retarded or in the slow speed or starting position for rotation in the direction of the arrow.

Fig. 3 is an elevation of the valve gear in the corresponding position for rotation in the direction opposite to Fig. 2.

Fig. 4 shows the valve gear in its central or full advanced position as assumed when the engine is developing its maximum power while rotating in either direction.

In Fig. 5 the valve gear is shown with the eccentric opposite to the crank.

Fig. 6 and Fig. 7 indicate the arrangement of the valve gear parts for non-reversing engines.

Figs. 8 to 15 inclusive, are diagrams showing the valve gear parts in various positions during a revolution of the crank.

Figure 1:
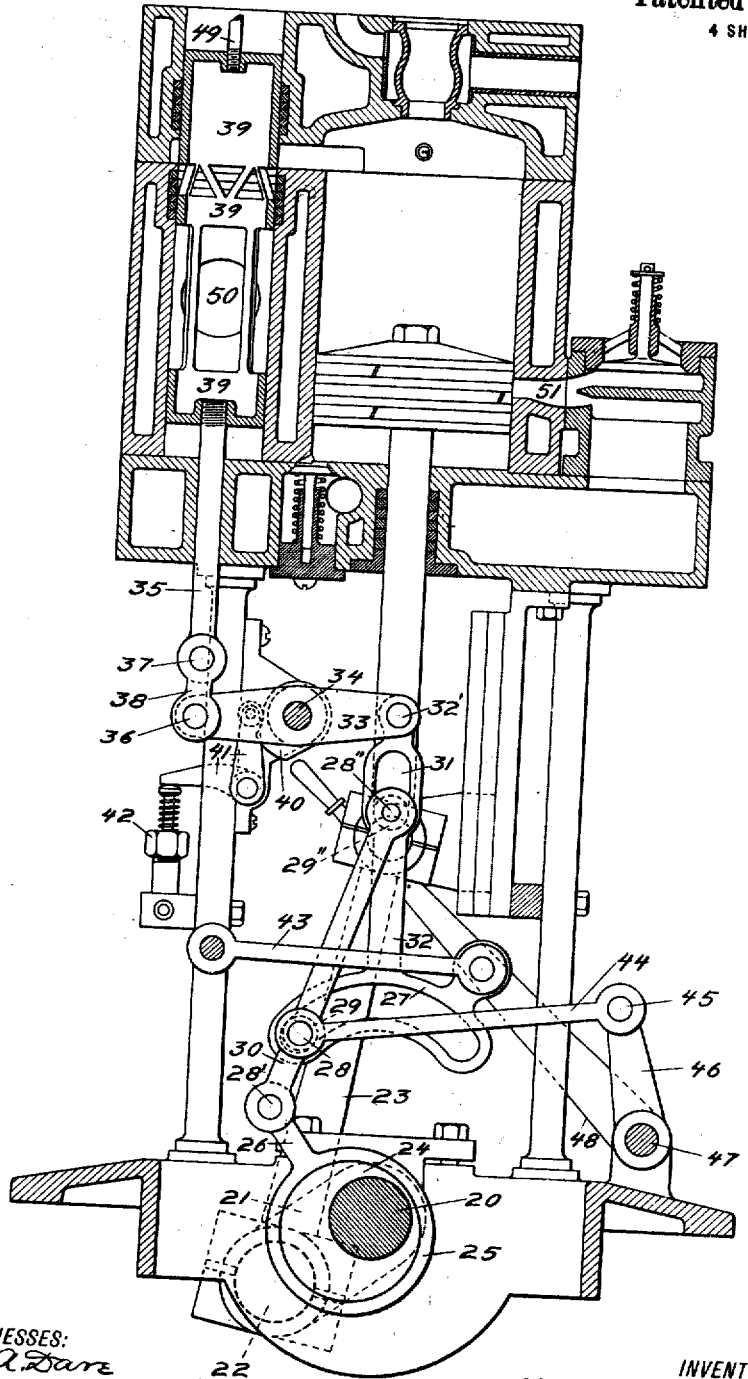
Figure 11:
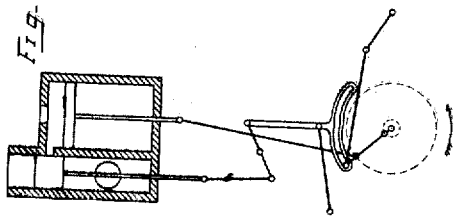
Figure 15:
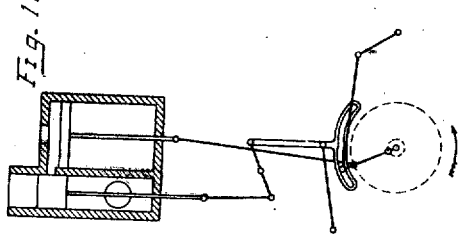
Figure 10:
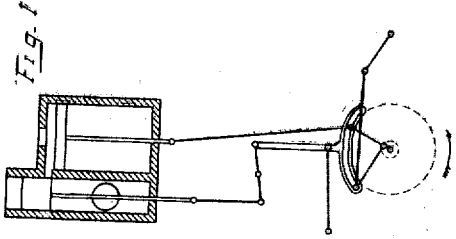
Figure 14:
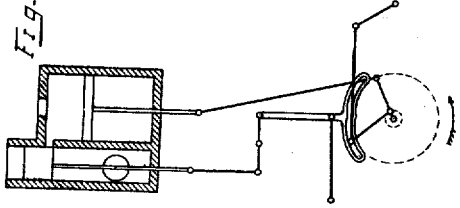
Figure 9:
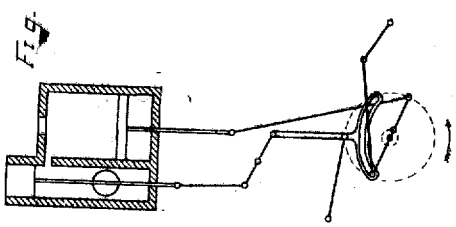
Figure 13:
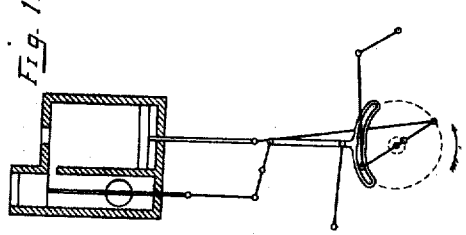
Figure 8:
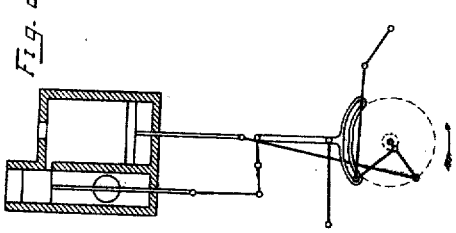
Figure 12:
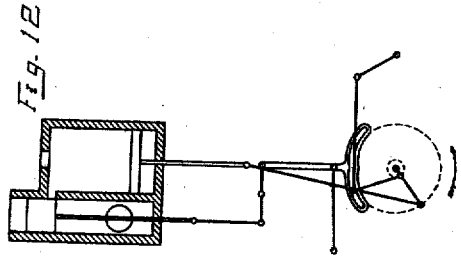

In the figures, 20 is the crank shaft provided with the usual crank arm 21, and crank pin 22, which is coupled to the reciprocating parts of the engine by means of the connecting rod 23, shown in Fig. 1, in the usual manner and therefore requires no further description. The eccentric 24 is securely fastened to the crank shaft, and always remains in the same angular position with the crank arm. The angularity of the eccentric with the crank arm depends upon the lead of the valve gear parts relative to the center line of the engine. If the connection of the valve gear parts is such as to lead them parallel with the center line of the engine, as is the case in Figs. 1, 2, 3 and 4, the angularity between eccentric and crank must be either 0° or 180° for a reversing engine. For a non reversing engine however, an angular advance or retard may be given to the eccentric.

The eccentric 24, is supplied with the eccentric strap 25 terminating in a short rod 26, which in the elementary valve gear engages with the curved link 27 directly by means of the pin 28 and roller 29. In practice however, the pin 28 is attached to a link 30, Fig. 1, to which the eccentric rod 26 is pivoted by means of the pin $28^1$. The other end of the link 30 carries the pin $28^{11}$ and roller $29^{11}$ engaging with the groove 31 in the link rod 32.

In Fig. 1 the link rod 32 is shown pivoted to the rocker arm 33 attached to the rock shaft 34. One end of the rocker arm 33 connects with the exhaust valve stem 35 by means of the pins 36 and 37 and the link 38. The valve stem 35 is attached to the exhaust valve 39, which in its preferred form is of the piston type, but any other type of valve may be employed with suitable connections.

The rock shaft 34, Fig. 1 also carries a cam 40, which through the bell crank mechanism 41, transmits the motion from the valve gear to the oil pump 42. The igniting mechanism of the engine is also operated by the rock shaft 34, but is not shown on the drawing as it involves none of the features of this invention, and may be of any commercial type.

While this combination forms a part of my invention, it may however be dispensed with, by attaching the link rod 32 directly to the valve stem 35 either through the pin 32¹, as in Figs. 2 and 3, or by a rigid connection and suitable straight line guides for the link 27.

The link 27 is prevented from swinging freely by the radius rod 43, connected to the link by, and swinging about, suitable pins. This suspension however does not impair the motion of the link in the direction at right angles to the radius rod, such being the motion desired, and obtained from the eccentric.

The link 27 is grooved to receive the roller 29, and the position of the latter within the groove of the link is governed by the reach rod 44, one end of which is attached to an extension of the pin 28, while the other end swings on the pin 45 attached to the end of the tumbling lever 46 which may be swung into any position within a determined arc by the tumbling shaft 47 and the operating lever 48 shown in Fig. 1.

The amount of swing to be given to the lever 46 depends upon the length of the link 27 and is determined by the desired variation of the valve motion.

The curvature of the link 27 is obtained in the following manner. Referring to the elementary valve gear in Figs. 2, 3 and 4, in Fig. 2, A is the position of the crank at the desired exhaust opening, and B is the center of the eccentric, which in the drawings is shown to be coinciding with the center line of the crank arm. For clearness of illustration it is desired in the present case to maintain the point of exhaust opening at the same crank angle during all speeds of the engine when turning in the direction of the arrow, and therefor the left hand arc of the link is struck with the point B as center, and any position the pin 28 and roller 29 may be swung into will have no effect upon the position of the valve 39, while the crank remains in position A.

The same is the case in Fig. 3, where the crank is in position A¹ and the center of the eccentric at B¹, the same number of degrees from the bottom center as in Fig. 2, but turning in the reverse direction, and the arc of curvature of the link to the right is struck with B¹ as a center. The link is therefore made up of two arcs intersecting each other at the center line of the engine.

If it is desired that the exhaust opening should vary for various speeds, the curve of the link must be plotted out to suit the desired condition, and as for the higher speeds the valve should open earlier in the stroke, the pin 28 being brought nearer to the central position, the curves of the link must be raised at their intersection in order to bring the link and valve into a lower position. The curvature of the link may thus be modified until it forms a continuous circular arc, which is the case in Fig. 1 and under practical working conditions.

If it should be desired to have the exhaust valve opening during its upward motion, while all other conditions remain unchanged, the design of the engine would be such as to require the eccentric to be opposing the crank arm and the condition shown in Fig. 5 would be obtained, where B is the center of the eccentric for the crank position A shown in full lines, and rotating in the direction of the solid arrow, and B¹ is the center of the eccentric for crank position A¹ shown in dotted lines, and rotating in the direction of the dotted arrow. The radii of the arcs of the link must therefore cross each other.

In the case of a non reversing engine, as for stationary purposes, one side of the link may be dispensed with, and the link made integral with the radius rod 43. In such a case the link rod 32 must be connected to the link by a pin joint, to permit the link to swing. Such an arrangement is shown in Fig. 6.

In Fig. 7 another form of the link for non reversing engine is shown. In this case the eccentric rod is pivoted to the end of the link and the link made integral with the reach rod and swinging about the pin 45 on the tumbling lever 46. On engines of this type the tumbling lever would be operated by a governor of suitable construction, but the lever could also be operated by hand.

In operation, the starting position as well as the position for the slow speed or light loads is shown in Figs. 2 and 3. The crank and eccentric at the point of exhaust opening are indicated by the full lines, and at the point of exhaust closing their position is indicated by the dotted lines, the exhaust valve remaining open during the angle traversed by the crank during this part of the revolution, and compression in the cylinder does not commence until near the end of the stroke. Owing to the method of admitting the scavenging air as set forth in my former applications only air will be exhausted from the cylinder, and no fuel wasted, as it enters after the closing of the exhaust valve.

The valve gear therefore governs also the point of admission, and this I accomplish by operating a controlling valve in combination with the fuel admission valve, by means of the rod 49 shown attached to the exhaust valve in Fig. 1.

This controlling valve has been referred to in my application Serial Number 835,638 filed May 1st, 1914, but is not a part of these applications, and will be the subject of a future application.

As the eccentric rod pin 28 is moved toward the center of the link, the exhaust valve will close earlier during the stroke, causing earlier and greater compression and admission and subsequently greater power or speed of the engine.

In Fig. 4 the valve gear is shown in the central position, the exhaust valve only remaining open during the crank angle indicated by the full and dotted lines, and the engine will develop its full power. With the valve gear in this position the engine will run in either direction, but as it also will be up to full speed, the danger of accidental backing is eliminated. The exhaust, at this position is dependent upon the scavenging air entering through the scavenging port 51 as set forth in application Number 557,649.

In the diagrams Figs. 8, 9, 10 and 11, the valve gear is shown in four consecutive positions, and fully retarded showing the position of the parts, respectively, at the point of exhaust opening, at the full opening of the exhaust valve, at exhaust closing and with the exhaust valve at the extreme of its travel after closing. While in Figs. 12, 13, 14 and 15, the same four consecutive positions of the valve gear parts are shown with the valve gear in a more advanced position and the consequent earlier closing of the exhaust valve.

While I consider the construction shown in the accompanying drawings and described in the specification, the most practical one, I do not consider it necessary to strictly adhere to it, as it will be understood that the object of the link 27 is to compensate for the greater distance between the pin 28¹ and the pin 32¹ when the eccentric rod is in any other but the central position. This compensation may be obtained by providing means for altering the length of the link 30, Fig. 1, or by adjusting the location of the rock shaft 34, and I therefore set forth the object of my invention and what I claim to be as new, in the following claims:

1. In an explosive engine having an exhaust valve (or valves), and an inlet valve (or valves) for admitting a charge of fuel and air to the cylinder of the engine, a valve gear for operating said valves and for controlling the speed or power of the engine by advancing or retarding the action of said valves relatively to the piston movement by a non-continuous port opening prolonged when the valve opening is retarded relatively to the movement of the piston and vice versa.

2. In an explosive engine with inlet and exhaust valves, a valve gear for operating said valves so as to cause the engine to run as an explosive engine, and for opening and closing the valves by the advancing or retarding of the valve gear so as to enable the engine to operate by externally stored pressure without the use of special attachments for this purpose.

3. In an explosive engine having inlet and exhaust valves, a fuel pump for supplying fuel to a spraying apparatus, and means for operating said fuel pump from the valve gear of the engine, the combination of a valve gear for controlling the speed or power of the engine by varying the opening and closing of the valves for obtaining an earlier or later stroke of the fuel pump so as to maintain proper coöperation between these parts.

4. In an explosive engine having inlet and exhaust valves, means for supplying fuel to the inlet valve and means for supplying air to the inlet valve for forming an explosive mixture in the cylinder of the engine and means for operating the ignition mechanism of the engine, the combination of a valve gear which can be advanced or retarded so as to control the speed or power of the engine by varying the action of the valves, the fuel supply apparatus and the igniting mechanism and to maintain these parts in proper coöperation.

5. In an explosive engine having inlet and exhaust valves, means for supplying fuel to the inlet valve, and means for supplying air to the inlet valve for forming an explosive mixture in the cylinder of the engine, and means for operating the ignition mechanism of the engine, the combination of a valve gear which can be advanced or retarded so as to operate said parts under running conditions and to maintain proper coöperation of said parts when the valve gear is placed into the starting position for the purpose of obtaining an explosive impulse for starting, without the use of special attachments as hereinbefore set forth.

6. In an explosive engine having an eccentric or cam upon the main shaft or an auxiliary shaft of the engine, said eccentric or cam to remain in a fixed position upon the shaft relatively to the crank of the engine, the combination of said eccentric or cam with a valve gear for operating the valves of the engine and for advancing or retarding the opening and closing of said valves relatively to the stroke of the piston.

7. In an explosive engine having an eccentric or cam upon the main shaft or an auxiliary shaft of the engine, said eccentric or cam to be in a fixed position upon the shaft relatively to the crank of the engine, the combination of said eccentric or cam with a valve gear for operating the valves of the engine, a fuel pump for supplying fuel to the engine, and for advancing or retarding the opening and closing of said valves the stroke of the fuel pump and the timing of the igniter in proper coöperation relatively to the stroke of the piston of the engine.

8. In an engine valve gear having an eccentric or cam upon a shaft in a fixed position relatively to the crank of an engine, means for transmitting reciprocating motion from said cam or eccentric to a link 27 and means for transmitting motion from said link to the valves, a fuel pump and an igniter forming part of the structure of the engine, said link to be guided by suitable guide rods, and means whereby the pin 28 and roller or block 29, may be thrown into any position within the link 27 for the purpose of regulating or reversing the motion of the engine.

9. In an engine valve gear having an eccentric or cam upon a shaft in a fixed position relatively to the crank of an engine, means for transmitting reciprocating motion from said cam or eccentric to a link or links 30, said links to be provided with a pin 28 and roller or block 29, also with a pin $28^{11}$ and roller or block $29^{11}$ engaging with grooves in the link 27 and means for transmitting motion from the link 27 to valves or accessories, the link 27 to be guided by suitable guides or guide rods, and means whereby the pin 28 and roller or block 29 may be thrown into any position within the link 27 for the purpose specified.

HENRY E. A. RAABE.

Witnesses:
BENJ. A. DARE,
ANDW. LINDSAY CRAWFORD.